United States Patent
Furui et al.

(10) Patent No.: US 9,606,271 B2
(45) Date of Patent: Mar. 28, 2017

(54) ANTI-GLARE FILM, METHOD FOR PRODUCING ANTI-GLARE FILM, POLARIZER, AND IMAGE DISPLAY DEVICE HAVING DIFFERENT SIZE PARTICLES WITH IMPREGNATION LAYERS

(75) Inventors: Gen Furui, Tokyo (JP); Takashi Kodama, Tokyo (JP); Makoto Honda, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 142 days.

(21) Appl. No.: 13/877,591

(22) PCT Filed: Sep. 30, 2011

(86) PCT No.: PCT/JP2011/072669
§ 371 (c)(1),
(2), (4) Date: Jun. 4, 2013

(87) PCT Pub. No.: WO2012/046664
PCT Pub. Date: Apr. 12, 2012

(65) Prior Publication Data
US 2013/0279010 A1 Oct. 24, 2013

(30) Foreign Application Priority Data
Oct. 4, 2010 (JP) .................................. 2010-225241

(51) Int. Cl.
*G02B 5/02* (2006.01)
*G02B 1/11* (2015.01)
(Continued)

(52) U.S. Cl.
CPC .............. *G02B 5/0242* (2013.01); *G02B 1/11* (2013.01); *G02B 5/0268* (2013.01);
(Continued)

(58) Field of Classification Search
None
See application file for complete search history.

(56) References Cited

U.S. PATENT DOCUMENTS

2006/0233972 A1   10/2006   Muramatsu et al.
2007/0229804 A1   10/2007   Inoue et al.
(Continued)

FOREIGN PATENT DOCUMENTS

CN       101163994       4/2008
CN       101268389       9/2008
(Continued)

*Primary Examiner* — Jennifer L. Doak
*Assistant Examiner* — Ryan S Dunning
(74) *Attorney, Agent, or Firm* — Hamre, Schumann, Mueller & Larson, P.C.

(57) ABSTRACT

The present invention provides an antiglare film having an excellent antiglare property and being capable of suitably preventing an occurrence of scintillation and a decrease in contrast. The antiglare film includes a light-transmitting substrate and a diffusion layer. The diffusion layer has a surface roughness and is formed on at least one side of the light-transmitting substrate, wherein the diffusion layer contains organic fine particles (A), organic fine particles (B), and a cured product of a binder component, and satisfies the expressions: (1) $\Delta_A < \Delta_B$; (2) $R_A > R_B$; and (3) $C_A/R_A^3 < C_B/R_B^3$, where $C_A$ and $C_B$ represent a content of the organic fine particles (A) or the organic fine particles (B) in the diffusion layer, respectively, $R_A$ and $R_B$ represent an average particle size thereof, respectively, and $\Delta_A$ and $\Delta_B$ represent a refractive index thereof relative to the cured product of the binder component, respectively.

9 Claims, 3 Drawing Sheets

(51) Int. Cl.
*G02B 1/111* (2015.01)
*G02B 5/30* (2006.01)

(52) U.S. Cl.
CPC ............ *G02B 5/3025* (2013.01); *G02B 1/111* (2013.01); *G02B 5/30* (2013.01)

(56) References Cited

U.S. PATENT DOCUMENTS

| | | | |
|---|---|---|---|
| 2007/0298193 | A1* | 12/2007 | Nakamura et al. .......... 428/1.33 |
| 2008/0030861 | A1* | 2/2008 | Ookubo et al. ............... 359/601 |
| 2009/0142562 | A1 | 6/2009 | Miyagawa et al. |
| 2009/0268299 | A1 | 10/2009 | Furui et al. |
| 2010/0097705 | A1 | 4/2010 | Furui et al. |
| 2010/0283944 | A1 | 11/2010 | Kodama et al. |
| 2011/0317099 | A1* | 12/2011 | Fuchida et al. ................. 349/64 |
| 2013/0057955 | A1 | 3/2013 | Kodama et al. |

FOREIGN PATENT DOCUMENTS

| | | |
|---|---|---|
| CN | 101308220 | 11/2008 |
| CN | 101341427 | 1/2009 |
| CN | 101506691 | 8/2009 |
| CN | 102782529 | 11/2012 |
| CN | 102782530 | 11/2012 |
| CN | 102822701 | 12/2012 |
| JP | 02-120702 | 5/1990 |
| JP | 2000-121809 | 4/2000 |
| JP | 2005-017920 | 1/2005 |
| JP | 2006-113561 | 4/2006 |
| JP | 2007-196421 | 8/2007 |
| JP | 2008-040063 | 2/2008 |
| JP | 2008-122832 | 5/2008 |
| JP | 2009-003331 | 1/2009 |
| JP | 2009-271400 | 11/2009 |
| JP | 2010-078886 | 4/2010 |
| TW | 201024847 | 7/2010 |
| WO | 2010/047301 | 4/2010 |
| WO | WO 2010106990 A1 * | 9/2010 |

* cited by examiner (a)

(b)

(a)

(b)

ANTI-GLARE FILM, METHOD FOR PRODUCING ANTI-GLARE FILM, POLARIZER, AND IMAGE DISPLAY DEVICE HAVING DIFFERENT SIZE PARTICLES WITH IMPREGNATION LAYERS

TECHNICAL FIELD

The present invention relates to an antiglare film, a method for producing the antiglare film, a polarizer, and an image display device.

BACKGROUND ART

Image display devices such as cathode-ray tube (CRT) display devices, liquid crystal displays (LCDs), plasma display panels (PDPs), electroluminescence displays (ELDs), field emission displays (FEDs), touch panels, electronic paper, and tablet PCs are generally provided with an optical layered body for antireflection on the outermost surface thereof. Such an antireflection optical layered body reduces double image reflection and lowers the reflectivity by light diffusion and interference.

As one of the antireflection optical layered bodies, an antiglare film including an antiglare having a surface roughness on a transparent substrate surface is known. Such an antiglare film can diffuse external light by the surface roughness on the surface thereof to prevent a decrease in visibility caused by external light reflection and double image reflection.

Known examples of conventional antiglare films include a type in which the surface roughness is formed on the surface of the antiglare layer by agglomeration of particles such as cohesive silica; a type in which an organic filler is incorporated into a resin and the surface roughness is formed with the organic filler on the layer surface; and a type in which the surface roughness is transferred to the layer surface by lamination of a film having projections and depressions.

All of these conventional antiglare films are formed to achieve light diffusion and antiglare effects by the function of the pattern of the antiglare layer surface. The projections and the depressions on the antiglare layer surface must be enlarged in order to enhance the antiglare property. However, as the projections and depressions are enlarged, the haze value of a coating film increases, causing discoloration. This unfortunately results in a decrease in transmission image definition.

Additionally, for example, in the case where a conventional antiglare film is used in a liquid crystal display device, when transmitted light from the back (for example, a back light) passes through the antiglare film having a surface roughness, the effect of such surface roughness of the film surface unfortunately produces "scintillation" that disrupts displayed pixels (scintillation appears as flashing "flickering" to the human eye, caused by the difference in luminance).

In order to prevent the occurrence of scintillation, there is a method, for example, in which internal diffusion is created by particles whose refractive index is different from that of a binder resin constituting the antiglare film.

In the case of preventing scintillation by the internal diffusion, the refractive index difference between the particles and the binder resin constituting the antiglare film must be increased, or the amount of particles must be increased.

However, when such a method for preventing scintillation is applied, there will be an interface between the binder resin and the particles, and consequently, reflection will occur unfortunately at the interface according to the refractive index difference between the binder resin and the particles, thus decreasing the contrast of the resulting image.

As a solution to the above problem, for example, there is a known method in which multi-layer particles having a refractive index that gradually changes from the core to the surface layer, and particles having a graded refractive index are used (for example, see Patent Literature 1). Additionally, for example, there is another known method in which particles having, at the particle surface, a layer with a thickness of about 100 nm and a refractive index is intermediate between the refractive indices between the binder resin and the particles are used in order to decrease the reflection at the interface between the binder and the particles (for example, see Patent Literature 2).

However, these particles are very expensive. In addition, due to production methods thereof, it is difficult to control the particle size and to increase the refractive index difference between the particle surface layer and the core. Thus, it has been difficult to increase internal diffusion.

Attempts to alleviate problems relating to scintillation, contrast, and discoloration have been made by using two types of particles having different sizes or two types of particles having different refractive indices at a specific mixing ratio (for example, see Patent Literatures 3, 4, 5, 6, 7, and 8). However, considerations are not given in a comprehensive manner in terms of particle sizes of particles that contribute to the surface roughness on the surface and particles that contribute to internal diffusion; mixing ratio; refractive indices; and the like. Thus, in reality, an antiglare film having excellent antiglare property, contrast, and scintillation is yet to be achieved.

CITATION LIST

Patent Literatures

Patent Literature 1: JP H02-120702 A
Patent Literature 2: JP 2005-17920 A
Patent Literature 3: JP 2010-78886 A
Patent Literature 4: JP 2007-196421 A
Patent Literature 5: JP 2008-40063 A
Patent Literature 6: JP 2008-122832 A
Patent Literature 7: JP 2009-3331 A
Patent Literature 8: JP 2009-271400 A

SUMMARY OF INVENTION

Technical Problem

In view of the current situation, the present invention aims to provide an antiglare film, a method for producing the antiglare film, and a polarizer and an image display device to which the antiglare film is applied, wherein the antiglare film has an excellent antiglare property and is capable of suitably preventing the occurrence of scintillation and a decrease in contrast.

Solution to Problem

The present invention provides an antiglare film including a light-transmitting substrate and a diffusion layer, the diffusion layer having a surface roughness on a surface thereof and being formed on at least one side of the light-transmitting substrate, wherein the diffusion layer contains organic fine particles (A), organic fine particles (B), and a cured product of a binder component, and the following expressions (1), (2), and (3) are satisfied:

$$\Delta_A < \Delta_B \quad \text{expression (1)},$$

$$R_A > R_B \quad \text{expression (2), and}$$

$$C_A/R_A^3 < C_B/R_B^3 \quad \text{expression (3)},$$

where $C_A$ represents a content of the organic fine particles (A) in the diffusion layer, $R_A$ represents an average particle size thereof, and $\Delta_A$ represents a refractive index difference thereof with respect to the cured product of the binder component, and $C_B$ represents a content of the organic fine particles (B) in the diffusion layer, $R_B$ represents an average particle size thereof, and $\Delta_B$ represents a refractive index difference thereof with respect to the cured product of the binder component.

In the antiglare film of the present invention, the binder component preferably includes a (meth)acrylate monomer and/or oligomer.

Further, at least the organic fine particles (A) preferably include an impregnation layer formed by impregnation with the binder component.

The present invention also relates to a method for producing an antiglare film including a light-transmitting substrate and a diffusion layer, the diffusion layer having a surface roughness on a surface thereof and being formed on at least one side of the light-transmitting substrate, the method including the steps of: applying a coating solution containing organic fine particles (A), organic fine particles (B), and a binder component on at least one side of the light-transmitting substrate; drying the coating solution to form a coating film; and curing the coating film to form the diffusion layer, wherein following expressions (1) to (3) are satisfied:

$$\Delta_A < \Delta_B \quad \text{expression (1)},$$

$$R_A > R_B \quad \text{expression (2), and}$$

$$C_A/R_A^3 < C_B/R_B^3 \quad \text{expression (3)},$$

where $C_A$ represents a content of the organic fine particles (A) in the diffusion layer, $R_A$ represents an average particle size thereof, and $\Delta_A$ represents a refractive index difference thereof with respect to the cured product of the binder component, and $C_B$ represents a content of the organic fine particles (B) in the diffusion layer, $R_B$ represents an average particle size thereof, and $\Delta_B$ represents a refractive index difference thereof with respect to the cured product of the binder component.

Further, the present invention also provides a polarizer comprising a polarizing element, wherein said polarizer has the antiglare film on the polarizing element surface.

Furthermore, the present invention also provides an image display device comprising the antiglare film of the present invention or the polarizer on an outermost surface thereof.

The present invention is described in detail below.

The antiglare film of the present invention includes a light-transmitting substrate and a diffusion layer, the diffusion layer having a surface roughness on the surface thereof and being formed on at least one side of the light-transmitting substrate.

The light-transmitting substrate preferably has smooth surface, heat resistance, and excellent mechanical strength. Specific examples of materials to form the light-transmitting substrate include polyesters (polyethylene terephthalate and polyethylene naphthalate), cellulose triacetate, cellulose diacetate, cellulose acetate butyrate, polyamide, polyimide, polyether sulfone, polysulfone, polypropylene, polymethyl pentene, polyvinyl chloride, polyvinyl acetal, polyether ketone, polymethyl methacrylate, polycarbonate, cycloolefin, polyurethane, or like other thermoplastic resin. Polyesters (polyethylene terephthalate and polyethylene naphthalate) are preferred in terms of mechanical strength, and cellulose triacetate is preferred because it does not disturb polarization.

The light-transmitting substrate is preferably used as a high flexible film form the thermoplastic resins listed above. Depending on the mode of use where hardness is required, plates of these thermoplastic resins can be used, or a plate-like glass sheet may be used.

In the case where the light-transmitting substrate is in a film form, the thickness thereof is preferably 20 to 300 μm. More preferably, the upper limit is 200 μm and the lower limit is 30 μm. In the case where the light-transmitting substrate is in a plate form, the thickness thereof may exceed the above ranges.

In forming a diffusion layer on the light-transmitting substrate, the light-transmitting substrate may be previously subjected to physical or chemical treatment such as corona discharge treatment and oxidation treatment, as well as application of an anchoring agent or a coating material called primer, in order to improve bonding performance.

The diffusion layer is formed on at least one side of the light-transmitting substrate, and contains the organic fine particles (A), the organic fine particles (B), and the cured product of the binder component.

Such a diffusion layer can be formed by applying a coating solution containing the organic fine particles (A), the organic fine particles (B), and the binder component on at least one side of the light-transmitting substrate; drying the coating solution to form a coating film; and curing the coating film to form the diffusion layer.

Herein, the "binder component" is cured by ionizing radiation and forms a polymer film, and thus the term "binder component" includes every molecule that can be a constituent unit of the basic structure of the polymer film. Specifically, the term "binder component" is a concept that includes resin components such as oligomers and prepolymers in addition to monomers.

Herein, as the diffusion layer of the antiglare film, there is a conventionally known diffusion layer that contains relatively large particles mainly for forming projections and depressions on the surface and relatively small particles mainly for providing internal diffusion. When such an antiglare film having a diffusion layer containing two types of particles is used to improve contrast of an image displayed on an image display device, reflection of the diffusion layer must be suppressed. Heretofore, the reflection of the diffusion layer has been believed to be the reflection of the surface of the diffusion layer.

The present inventors extensively examined the reflection of the diffusion layer. As a result, they found that fine particles contained in the diffusion layer are sparsely present therein and are hardly overlapped with each other in the thickness direction, and thus the reflection of the diffusion layer is the sum of reflection at the surface and the reflection of fine particles inside the diffusion layer; and that the reflection of the fine particles inside the diffusion layer is determined according to the size and amount of the particles as well as the refractive index difference of the particles with respect to a cured product of the binder component. The present inventor also found that addition of fine particles having a large refractive index difference with respect to a cured product of the binder component is effective in reducing scintillation.

The present invention was accomplished in view of these findings by the present inventors and consideration that the diffusion layer should contain relatively large particles mainly for forming projections and depressions on the surface and relatively small particles mainly for providing internal diffusion.

Specifically, in the antiglare film of the present invention, the organic fine particles (A) contained in the diffusion layer are fine particles that mainly function to form a surface roughness on the surface of the diffusion layer, and the organic fine particles (B) contained in the diffusion layer are fine particles that mainly function to provide internal diffusion in the diffusion layer.

The diffusion layer containing such organic fine particles (A) and organic fine particles (B) satisfies the following expressions (1), (2), and (3):

$$\Delta_A < \Delta_B \quad \text{expression (1),}$$

$$R_A > R_B \quad \text{expression (2), and}$$

$$C_A/R_A^3 < C_B/R_B^3 \quad \text{expression (3),}$$

where $C_A$ represents and a content of the organic fine particles (A), $R_A$ represents an average particle size thereof, and $\Delta_A$ represents a refractive index difference thereof in the diffusion layer with respect to the cured product of the binder component, and $C_B$ represents a content of the organic fine particles (B), $R_B$ represents an average particle size thereof, and $\Delta_B$ represents a refractive index difference thereof in the diffusion layer with respect to the cured product of the binder component. The refractive indices of the organic fine particles (A) and the organic fine particles (B) in the diffusion layer indicate average refractive indices of these organic fine particles (A) and (B).

The expression (1) indicates that the refractive index difference between the organic fine particles (B) and the cured product of the binder component is greater than that between the organic fine particles (A) and the cured product of the binder component. The antiglare film of the present invention includes the diffusion layer containing the organic fine particles (A) and the organic fine particles (B) in which the expression (1), the expression (2) (described later), and the expression (3) (described later) are satisfied, and this results in higher internal diffusion effect in the diffusion layer, excellent scintillation preventing effect, and excellent contrast.

The refractive index of the organic fine particles (A) and the refractive index of organic fine particles (B) before being introduced into the diffusion layer can be measured, for example, by methods such as Becke's method, least deflection angle method, deflection angle analysis, mode-line analysis, and ellipsometry method. The refractive index of the cured product of the binder component can be determined as follows: a coating solution for forming the diffusion layer to which the fine particles are not added is applied, dried, and cured to prepare a cured film solely formed from the binder component, and the cured film is measured using Abbe's refractometer.

As the method for measuring the refractive indices of the cured product of the binder component, the organic fine particles (A), and the organic fine particles (B) in the diffusion layer, the above-mentioned methods can be similarly applied, using the organic fine particles, pieces of the organic fine particles, or pieces of the cured product of the binder component, which are isolated by some means from the diffusion layer of the prepared antiglare film. In addition, the refractive index differences of the cured product of the binder component with respect to the organic fine particles (A) and the organic fine particles (B) can be measured using a phase-shifting laser interference microscope (such as phase-shifting laser interference microscope manufactured by FK Opt Labo Co., Ltd., or two-beam interference microscope manufactured by Mizojiri Optical Co., Ltd.).

In the case where the binder component contains (meth)acrylate (described later) and other resins, the refractive index of the cured product of the binder component refers to an average refractive index of cured products of all resin components excluding the organic fine particles.

In the case where the surface roughness is formed on the surface of the diffusion layer by fine particles, projections and depressions (projections) are formed on the surface according to the number of the fine particles, and such surface roughness on the surface of the diffusion layer causes a scintillation problem.

Specifically, when image light from the projector side transmits through the diffusion layer and enters the surface roughness (projection) on the surface, the image light is refracted by the projection and the depression configuration and exits from the observation side. At this time, in the case where the projection and depression (projection) configuration of the diffusion layer surface has a smooth slope in which there is no singularity as illustrated in FIG. 1(a), the diffusion distribution of the outgoing light is smooth as illustrated in FIG. 1(b) and no change in brightness will be detected. Thus, the scintillation problem will not occur.

However, as illustrated in FIG. 2(a), in the case where there is a singularity in the surface roughness (projection) on the surface of the diffusion layer and image light exits in the same direction before and after the singularity, this causes a situation where highly intense light exits only at an angle θ on the surface that should normally have a smooth diffusion distribution and intensity.

At this time, image light that normally should exit at an angle slightly larger or smaller than the angle θ also exits at the angle θ. Thus, it causes a decrease in the amount of outgoing image light at an angle slightly larger or smaller than the angle θ. As a result, as illustrated in FIG. 2(b), the brightness drops rapidly at an angle slightly smaller (larger) than the angle θ on the projection showing a smooth brightness change, and the brightness increases rapidly at the angle θ. Then, the brightness drops rapidly again at an angle slightly larger (smaller) than the angle θ. Thereafter, the brightness returns to the original smooth brightness change. Because of the occurrence of such phenomena, a Mach effect is created, causing the scintillation problem.

In contrast, in the case where the diffusion layer contains fine particles that contribute to internal diffusion, image light that enters the diffusion layer is diffused by the internal diffusion effect of the fine particles. Even if the above-described singularity was present in the surface roughness (projection) of the diffusion layer, image light that exits in the same direction at an angle θ would be attenuated, and at the same time, image light that exits at an angle slightly smaller or larger than the angle θ would be intensified.

As a result, even if there was a singularity in the surface roughness (projection) on the surface of the diffusion layer, an increase in the intensity of image light in the direction of the angle θ would be suppressed, and at the same time, a decrease in the intensity of outgoing image light near the angle θ would also be suppressed, thus maintaining the original smooth brightness change. Therefore, the occurrence of scintillation can be suitably suppressed.

As a result of extensive studies based on such knowledge, the present inventors found that achieving an antiglare film in which the occurrence of scintillation is sufficiently suppressed requires an increase in the number of the sites for internal diffusion, which is determined by the number of fine particles (organic fine particles (B)) that contribute to internal diffusion in the diffusion layer, compared to the number of fine particles (organic fine particles (A)) that contribute to formation of the surface roughness on the surface of the diffusion layer.

FIG. 1(a) shows a cross section schematically illustrating how image light transmitting through a diffusion layer that does not produce scintillation is refracted on the diffusion layer surface. FIG. 1(b) is a graph showing the relationship between the brightness of the image light shown in FIG. 1(a) and the diffusion angle. FIG. 2(a) shows a cross section schematically illustrating how image light transmitting through a diffusion layer that produces scintillation is refracted on the diffusion layer surface. FIG. 2(b) is a graph showing the relationship between the brightness of the image light shown in FIG. 2(a) and the diffusion angle.

The expression (2) indicates that the average particle size of the organic fine particles (A) is larger than that of the organic fine particles (B). This is a necessary requirement for forming the surface roughness on the surface of the diffusion layer by the organic fine particles (A) and achieving internal diffusion effect in the diffusion layer by the organic fine particles (B).

The expression (3) indicates that the number of the organic fine particles (B) is greater than the number of the organic fine particles (A) in the diffusion layer.

Specifically, based on the assumption that both of the organic fine particles (A) and the organic fine particles (B) are spherical, the numbers of the organic fine particles (A) and (B) in the diffusion layer, which are respectively represented by $N_A$ and $N_B$, are determined as follows:

$$N_A = C_A / [(4/3) \times \pi \times (R_A/2)^3 \times W_A], \text{ and}$$

$$N_B = C_B / [(4/3) \times \pi \times (R_B/2)^3 \times W_B],$$

where $W_A$ represents a specific weight of the organic fine particles (A) and $W_B$ represents a specific weight of the organic fine particles (B).

The specific weights ($W_A$ and $W_B$) of the organic fine particles (A) and the organic fine particles (B) are considered as follows:

$$W_A \approx W_B.$$

Since $N_B > N_A$, $$C_B / [(4/3) \times \pi \times (R_B/2)^3 \pi W_B] > C_A / [(4/3) \times \pi \times (R_A/2)^3 \times W_A].$$

Thus, the expression, $C_A/R_A^3 < C_B/R_B^3$, is derived from the above.

When the expression (3) is not satisfied, an image display device having the antireflection film of the present invention cannot sufficiently suppress scintillation of an image displayed thereon.

In the antiglare film of the present invention, because both of the organic fine particles (A) and the organic fine particles (B) are organic fine particles, as described later, it is possible to form an impregnation layer impregnated with a binder component in these organic fine particles and to suitably achieve an antiglare film satisfying the expressions (1) to (3) in which the diffusion layer has improved properties such as contrast.

In the antiglare film of the present invention, at least the organic fine particles (A) preferably include an impregnation layer formed by impregnation with the binder component. In the antiglare film of the present invention, the organic fine particles (B) may also include an impregnation layer formed by impregnation with the binder component. The reason thereof is described below based on the assumption that each organic fine particles (A) includes the impregnation layer.

The impregnation layer of the organic fine particles (A) is formed as a mixture of the binder component and materials constituting the organic fine particles (A). Specifically, the organic fine particles (A) are configured to maintain, at the core, a refractive index of the organic fine particles having no impregnation layer (i.e., the refractive index of the organic fine particles (A) before being introduced into the diffusion layer (hereinafter referred to as "organic fine particles (a)")), while having a refractive index close to that of the cured product of the binder component in the vicinity of the interface with the cured product. As a result, the diffusion property is maintained at the core where the refractive index difference of the organic fine particle (A) with respect to the cured product of the binder component is maintained, and the reflectivity of the organic fine particles (A) is reduced at the same time. Further, the organic fine particles (A) having the impregnation layer have extremely excellent adhesion with the cured product of the binder component in the diffusion layer.

Further, because the organic fine particles (A) have the impregnation layer, the antiglare film of the present invention has excellent stability (heat and humidity resistance) against changes in the degree of antiglare over time associated with changes in humidity and temperature. The following mechanism is assumed to be a reason of such improvement.

Specifically, it is assumed from a heat and humidity resistance test that in the case of conventional antiglare films containing organic fine particles, moisture that has penetrated the diffusion layer affects the strain at the interface between the organic fine particles and the binder resin, causing changes such as an increase in the strain, loosening of the strain, and formation of microcracks, and thus inducing time-dependent changes in the antiglare property (changes in haze). Such strain is prominent in the organic fine particles having a large particle size.

On the other hand, in the case where an impregnation layer is formed as in the organic fine particles (A) of the present invention, the strain at the interface between the organic fine particles (A) and the cured product of the binder component is reduced. Therefore, it is assumed that changes such as an increase in the strain, loosening of the strain, and formation of microcracks are suppressed.

Further, as described later, the impregnation layer is suitably formed by allowing the binder component and/or solvent to swell the organic fine particles (a). This means that the organic fine particles (A) are highly flexible particles. Accordingly, the surface of the diffusion layer has projections formed at positions corresponding to the organic fine particles (A) in the diffusion layer, but it is also possible to smooth out these projections.

Specifically, the most preferred embodiment of the present invention is an antiglare film satisfying the expressions (1) to (3), wherein the diffusion layer uses organic fine particles having an impregnation layer.

This point is described in further detail later.

Materials constituting the organic fine particles (A) are preferably those that are swollen by the binder component and/or solvent (described later). Specific examples include polyester resin, styrene resin, (meth)acrylic resin, olefin resin, or copolymers thereof. Among these examples, crosslinked (meth)acrylic resin is suitably used. The term "(meth) acrylic" used herein refers to acrylic or methacrylic. Herein, when the organic fine particles are produced using (meth) acrylic resin, styrene resin, or (meth)acrylic-styrene copolymers by a generally known production method, (meth) acrylic-styrene copolymer resin may be used as a material.

Further, in the case where the organic fine particles (A) are core-shell fine particles, examples thereof include polystyrene fine particles in which fine particles formed from (meth)acrylic resin are used in the core, and poly(meth) acrylic fine particles in which fine particles formed from styrene resin are used in the core. Therefore, herein, (meth) acrylic fine particles, styrene fine particles, and (meth) acrylic-styrene copolymer fine particles are distinguished by determining which resin is most similar to these fine particles in terms of their properties (e.g., refractive index). For example, fine particles having a refractive index of less than 1.50 can be regarded as (meth)acrylic fine particles, fine particles having a refractive index of 1.50 or more to less than 1.59 can be regarded as (meth)acrylic-styrene copolymer fine particles, and fine particles having a refractive index of 1.59 or more can be regarded as styrene fine particles.

Suitable examples of the crosslinked (meth)acrylic resin include homopolymers and copolymers obtained by polymerizing acrylic monomers such as acrylic acid, acrylic ester, methacrylic acid, methacrylic ester, acrylamide, and acrylonitrile using polymerization initiators such as persulfuric acid salts and crosslinking agents such as ethylene glycol dimethacrylate, by methods such as suspension polymerization.

Particularly suitable examples of the acrylic monomers are crosslinked acrylic resins obtained using methyl methacrylate. It is possible to control the thickness of the impregnation layer by adjusting the degree of swelling by the binder component and/or solvent (described later). In order to do so, it is preferred to change the degree of crosslinking so that the amount of impregnation of the binder component will be within a preferred range.

A suitable average particle size $R_A$ of the organic fine particles (A) is, for example, in the range of 0.5 to 15.0 µm and less than the thickness of the diffusion layer. In particular, a range of 1.0 to 10.0 µm is more suitable. In the case where the particle size is less than 0.5 µm, the antiglare film of the present invention may have an insufficient antiglare property. In the case where the particle size is more than 15.0 µm or more than the thickness of the diffusion layer, an image on a display having the antiglare film of the present invention may be rough and low in quality.

Before the organic fine particles are incorporated into the diffusion layer, the average particle size is a measurement of the organic fine particles (A), and it can be determined as the weight average size by Coulter counter method. On the other hand, after the organic fine particles are incorporated into the diffusion layer, the average particle size is a measurement of the organic fine particles (A) in the diffusion layer, and it can be determined as an average maximum diameter of 10 organic fine particles (A) through observation of the diffusion layer under a transmitted light microscope. In the case where the above measurement is inappropriate, the cross section passing through the center or near the center of the organic fine particle (A) is observed under an electron microscope (preferably transmission type such as TEM and STEM), and any same type of 30 organic fine particles (A) observed as having substantially the same particle size are selected (the number "n" of the particles is increased because it is unclear which part of the particles is observed as the cross section) to measure the maximum cross section diameter of each particle. An average of these measurements is determined as the average particle size. In any case, the average particle size is determined from images, and thus, image analysis software may be used for calculation.

The average particle size of the organic fine particles (B) and organic fine particles (b) (described later) can also be measured in the same manner.

The impregnation layer of the organic fine particle (A) in the diffusion layer is a layer formed by impregnation of the binder component from the outer surface of the organic fine particle (A) to the core thereof. The impregnation layer is a layer formed by being impregnated with low-molecular-weight constituents of the binder component, i.e., mainly monomers. The impregnation layer is not likely to be impregnated with high-molecular polymers in the binder component, i.e., polymers and oligomers.

The impregnation layer can be determined, for example, by observing the cross section of the organic fine particles (A) in the diffusion layer under a microscope (such as STEM).

The impregnation layer may be impregnated with all the constituents of the binder component or a part of the constituents of the binder component.

The impregnation layer preferably has an average thickness of 0.01 to 1.0 µm. In the case where the average thickness is less than 0.01 µm, the effect to be achieved by the formation of the impregnation layer cannot be sufficiently achieved. In the case where the average thickness is more than 1.0 µm, the internal diffusion function of the organic fine particles (A) cannot be sufficiently exerted, and the scintillation preventing effect may not be sufficiently achieved. A more preferred lower limit of the average thickness of the impregnation layer is 0.1 µm, and a more preferred upper limit thereof is 0.8 µm. The average thickness in the range results in enhancement of the above-described effects.

The term "average thickness of the impregnation layer" as used herein refers to an average thickness of the impregnation layers in the cross sections of the organic fine particles (A) observed on images of the cross sections of the antiglare films under an electron microscope (preferably transmission type such as TEM and STEM). Specifically, the cross section of the diffusion layer is viewed under an electron microscope at 3,000 to 50,000 magnification and any five sites where at least one fine particle having the impregnation layer is present is observed and photographed. Subsequently, the thickness of the impregnation layer is measured at two points per fine particle, and an average of the measurements at 10 points is determined as an average thickness. For the measurement of the thickness of the impregnation layer, two sites that satisfy the following conditions are selected: the boundary between a fine particle and the cured product of the binder component surrounding the fine particle is relatively clear; and impregnation seems to be at its maximum.

The organic fine particles generally have a crosslinked structure, and the degree of swelling by the binder component or solvent varies depending on the degree of crosslinking. Usually, the higher the degree of crosslinking, the lower the degree of swelling, whereas lower the degree of crosslinking, the higher the degree of swelling. Therefore, for example, in the case where the materials constituting the organic fine particles (A) are the crosslinked acrylic resin described above, the thickness of the impregnation layer can be controlled to be within a desired range by suitably adjusting the degree of crosslinking of the crosslinked acrylic resin.

As for the organic fine particles (A) in the antiglare film of the present invention, an antiglare film is prepared in advance using a coating solution that contains organic fine particles with different degrees of crosslinking, and organic fine particles corresponding to a desired degree of impregnation may be selected.

Additionally, the organic fine particles (A) preferably do not agglomerate in the diffusion layer. In the case where the organic fine particles (A) agglomerate in the diffusion layer, large projections are formed on the diffusion layer surface at the positions corresponding to the agglomerated organic fine particles (A), and problems such as discoloration and scintillation may occur to the antiglare film of the present invention. Agglomeration of the organic fine particles (A) in the diffusion layer can be suitably prevented by, for example, introducing a layered inorganic compound (described later) into the diffusion layer.

The content $C_A$ of the organic fine particles (A) in the diffusion layer is preferably 0.5 to 30 parts by mass, based on 100 parts by mass of the cured product of the binder component. At less than 0.5 parts by mass, a surface roughness cannot be sufficiently formed on the diffusion layer surface, and the antiglare film of the present invention may have an insufficient antiglare property. On the other hand, at more than 30 parts by mass, agglomeration of the organic fine particles (A) occurs in the diffusion layer, and large projections are formed on the diffusion layer surface, possibly causing problems such as discoloration and scintillation. A more preferred lower limit of the content $C_A$ of the organic fine particles (A) is 1.0 part by mass, and a more preferred upper limit is 20 parts by mass. In this range, the above-described effects can be more reliably achieved.

In a diffusion layer composition, i.e., a composition used for forming the diffusion layer, the content $C_A$ of the organic fine particles (A) refers to parts by mass based on 100 parts by mass of the binder component. The content $C_A$ of the organic fine particles (A) can also be calculated using the diffusion layer, which is a cured product. In this case, a micrograph of a cross section of the diffusion layer in a direction perpendicular to the light-transmitting substrate is taken, and the number (N) of the organic fine particles (A) contained per unit area in the micrograph, the average particle size ($R_A$), and the thickness (T) of the diffusion layer measured from a cross-sectional image of the antiglare film are used to calculate the volume ratio ($N \times \pi \times R_A^3/6/T$) of the organic fine particles (A) per unit area of the antiglare film. The calculated volume ratio is regarded as the content $C_A$ of the organic fine particles (A).

The organic fine particles (B) are fine particles that satisfy the expressions (1) to (3). Specifically, these are fine particles with the following properties: the refractive index difference $\Delta_B$ thereof with respect to the cured product of the binder component is greater than the refractive index difference $\Delta_A$ of the organic fine particles (A) with respect to the cured product of the binder component; the average particle size thereof is smaller than that of the organic fine particles (A); and the number thereof in the diffusion layer is smaller than the number of organic fine particles (A).

Examples of such organic fine particles (B) include organic particles such as polystyrene resin, melamine resin, polyester resin, acrylic resin, olefin resin, or copolymers thereof. These organic fine particles (B) may be used alone or in combination of two or more types.

Among the above, polystyrene fine particles and/or acrylic-styrene copolymer fine particles are suitably used because these fine particles have a high refractive index and thus it is easy to make a refractive index difference between these fine particles and the cured product of the binder component (for example, general radiation curable binders have a refractive index of about 1.48 to 1.54) and to achieve internal diffusion.

Hereinafter, the fine particles may be referred to as "highly crosslinked" or "lightly crosslinked" fine particles. The term "highly crosslinked" and "lightly crosslinked" are defined as follows.

A mixture of toluene and methyl isobutyl ketone (a mass ratio of 8:2) is added in an amount of 190 parts by mass to 100 parts by mass of a radiation curable binder (a mixture of pentaerythritol triacrylate (PETA), dipentaerythritol hexaacrylate (DPHA), and polymethyl methacrylate (PMMA: a weight average molecular weight of 75,000) (a mass ratio of PETA/DPHA/PMMA=80/10/10)) to prepare a coating solution.

Fine particles are immersed in the obtained coating solution. Immediately thereafter, the fine particles are placed on a slide glass using a dropper, and a cover glass is placed thereon. These fine particles are observed under a light microscope and an average particle size d0 (an average of 20 fine particles) is determined. Further, fine particles that were kept at 30° C. for 24 hours after immersion were similarly observed under a light microscope, and an average particle size d24 is determined. When the change ratio of the particle size thus determined [(d24−d0)/d0]×100) is 5% or more, such fine particles are referred to as "lightly crosslinked" fine particles. When the ratio of the change is less than 5%, such fine particles are referred to as "highly crosslinked" fine particles.

Each organic fine particle (B) may include an impregnation layer impregnated with a binder component as long as the above expressions (1) to (3) are satisfied.

As is the case with the above-described organic fine particles (A), because the organic fine particles (B) have the impregnation layer, scintillation is suppressed, contrast is improved, and the antiglare film of the present invention has excellent stability (heat and humidity resistance) against changes in the degree of antiglare over time associated with changes in humidity and temperature. In the following description, the organic fine particles (B) before being incorporated into the diffusion layer are referred to as organic fine particles (b).

The average thickness of the impregnation layer formed in the organic fine particle (B) is preferably thinner than that of the impregnation layer formed in the organic fine particle (A). Because the average particle size $R_B$ of the organic fine particles (B) is smaller than the average particle size $R_A$ of the organic fine particles (A), in the case where the impregnation layer of the organic fine particle (B) is thicker than the impregnation layer of the organic fine particle (A), the core of the organic fine particle (B) that is required to have a large diffusion angle is reduced in size. As a result, the diffusion layer may have an insufficient diffusion property.

Whether the impregnation layer is formed in the organic fine particles (B) in the diffusion layer can be determined by, for example, observing the cross section of the organic fine particles (B) in the diffusion layer under a microscope (such as STEM).

In the antiglare film of the present invention, for example, an antiglare film is prepared in advance using a coating solution that contains organic fine particles having different degrees of crosslinking, and organic fine particles corresponding to a desired degree of impregnation may be selected as the organic fine particles (B).

The content $C_B$ of the organic fine particles (B) in the diffusion layer is preferably 0.5 to 30 parts by mass, based on 100 parts by mass of the cured product of the binder component (described later). At less than 0.5 parts by mass, scintillation easily occurs, while at more than 30 parts by mass, it may result in a lower contrast. A more preferred lower limit of the content $C_B$ of the organic fine particles (B) is 1.0 part by mass, and a more preferred upper limit thereof is 20 parts by mass. In this range, the above-described effects can be more reliably achieved. The content $C_B$ of the organic fine particles (B) refers to a value measured in the same manner as in the organic fine particles (A).

The binder component preferably includes a (meth)acrylate monomer as an essential constituent.

Suitable examples of the binder component include those that swell the organic fine particles (a) and the organic fine particles (b). A transparent binder component is preferred. Examples thereof include ionizing radiation-curable resin that is cured by ultraviolet light or electron beam. Further, the "monomers" as used herein cured by ionizing radiation to form a polymer film. Thus, the "monomers" include every molecule that can be a constituent unit of the basic structure of the polymer film, and have an unsaturated bond. In other words, if oligomers and prepolymers are the basic units of the cured film, the term "monomers" also includes such oligomers and prepolymers.

In the present invention, the monomers preferably have a molecular weight of 5,000 or less.

In the present invention, the weight average molecular weight can be measured against a polystyrene standard by gel permeation chromatography (GPC) in THF solvent.

Examples of the (meth)acrylate monomer include compounds having one or two or more unsaturated bonds, such as a compound having a (meth)acrylate-based functional group.

Examples of compounds having one unsaturated bond include ethyl (meth)acrylate, ethylhexyl (meth)acrylate, styrene, methylstyrene, and N-vinylpyrrolidone. Examples of compounds having two or more unsaturated bonds include polyfunctional compounds such as polymethylolpropane tri(meth)acrylate, hexanediol di(meth)acrylate, polypropylene glycol di(meth)acrylate, diethylene glycol di(meth)acrylate, polyethylene glycol di(meth)acrylate, bisphenol F EO-modified di(meth)acrylate, bisphenol A EO-modified di(meth)acrylate, trimethylolpropane tri(meth)acrylate, dipentaerythritol penta(meth)acrylate, isocyanuric acid EO-modified di(meth)acrylate, isocyanuric acid EO-modified tri(meth)acrylate, trimethylolpropane PO-modified tri(meth)acrylate, trimethylolpropane EO-modified tri(meth)acrylate, ditrimethylolpropane tetra(meth)acrylate, pentaerythritol tri (meth)acrylate, dipentaerythritol hexa(meth)acrylate, 1,6-hexanediol di(meth)acrylate, neopentylglycol di(meth)acrylate; and reaction products of these polyfunctional compounds with (meth)acrylate and the like (for example, poly(meth)acrylate esters of polyols).

Examples also include urethane (meth)acrylate and polyester (meth)acrylate having two or more unsaturated bonds.

In addition to the (meth)acrylate monomer, relatively low-molecular weight resins having an unsaturated double bond, such as polyester resin, polyether resin, acrylic resin, epoxy resin, urethane resin, alkyd resin, spiroacetal resin, polybutadiene resin, and polythiol-polyene resin, can also be used as the ionizing radiation-curable resin.

When the ionizing radiation-curable resin is used as ultraviolet light-curable resin, the coating solution prepared for forming the diffusion layer preferably contains a photopolymerization initiator.

Specific examples of the photopolymerization initiators include acetophenones, benzophenones, Michler-Benzoyl benzoate, α-Amyloxim ester, thioxanthones, propiophenones, benzils, benzoins, and acylphosphine oxides. Further, a photosensitizer is preferably mixed. Specific examples thereof include n-butylamine, triethylamine, and poly-n-butylphosphine.

In the case where the ultraviolet light-curable is a type of resin that has a radical polymerization unsaturated group, the photopolymerization initiators such as acetophenones, benzophenones, thioxanthones, benzoins, and benzoin methyl ether are preferably used alone or in combination. In the case where the ultraviolet light-curable resin is a type of resin that has a cationic polymerizable functional group, the photopolymerization initiators such as aromatic diazonium salts, aromatic sulfonium salts, aromatic iodonium salts, metallocene compounds, and benzoin sulfonate are preferably used alone or in combination.

The amount of the photopolymerization initiator added is preferably 0.1 to 10 parts by mass based on 100 parts by mass of the ultraviolet light-curable resin.

The ionizing radiation-curable resin can also be used in combination with solvent drying-type resin (i.e., thermoplastic resins and the like that are formed into a coating simply by drying a solvent that was added to adjust the solids content of a coating solution at the time of coating).

Examples of the solvent drying-type resin mainly include thermoplastic resins. Commonly exemplified thermoplastic resins can be used. Addition of the solvent drying-type resin can effectively prevent defects in the coating film on the coated surface.

Specific examples of preferred thermoplastic resins include styrene resin, (meth)acrylic resin, vinyl acetate resin, vinyl ether resin, halogen-containing resin, alicyclic olefin resin, polycarbonate resin, polyester resin, polyamide resin, cellulose derivatives, silicone resin, and rubbers or elastomers.

As the thermoplastic resin, it is usually preferred to use a resin that is amorphous and soluble in organic solvents (particularly, common solvents in which several polymers and curable compounds can be dissolved). In particular, resins with high formability or film-forming property, transparency, and weather resistance, such as styrene resin, (meth)acrylic resin, alicyclic olefin resin, polyester resin, and cellulose derivatives (cellulose esters and the like), are preferred.

According to a preferred embodiment of the present invention, in the case where the light-transmitting substrate is formed from cellulose resins such as triacetyl cellulose (TAC), specific examples of thermoplastic resins preferably include cellulose resins such as nitrocellulose, acetylcellulose, cellulose acetate propionate, and ethyl hydroxyethyl cellulose. Use of the cellulose resin improves adhesion between the light-transmitting substrate and the diffusion layer and transparency.

The binder component may further contain a thermosetting resin. Examples of thermosetting resins include phenolic resin, urea resin, diallyl phthalate resin, melamine resin, guanamine resin, unsaturated polyester resin, polyurethane resin, epoxy resin, amino alkyd resin, melamine-urea co-condensed resin, silicon resin, and polysiloxane resin. When a thermosetting resin is used, curing agents such as cross-linking agents and polymerization initiators, polymerization promoters, solvents, viscosity modifiers, and the like may be concomitantly used, if necessary.

The coating solution further preferably includes a solvent.

The solvent is not particularly limited. Examples thereof include water, alcohols (e.g., methanol, ethanol, isopropanol, butanol, and benzyl alcohol), ketones (e.g., acetone, methyl ethyl ketone, methyl isobutyl ketone, cyclohexanone, and cyclopentanone), esters (e.g., methyl acetate, ethyl acetate, propyl acetate, butyl acetate, methyl formate, ethyl formate, propyl formate, and butyl formate), aliphatic hydrocarbons (e.g., hexane and cyclohexane), halogenated hydrocarbons (e.g., methylene chloride, chloroform, and carbon tetrachloride), aromatic hydrocarbons (e.g., benzene, toluene, and xylene), amides (e.g., dimethylformamide, dimethylacetamide, and n-methylpyrrolidone), ethers (e.g., diethyl ether, dioxane, and tetrahydrofuran), and ether alcohols (e.g., 1-methoxy-2-propanol).

Both of the binder component and the solvent to be used may have the property of swelling the organic fine particles (a) and the organic fine particles (b), or either the binder component or the solvent may have the property of swelling the organic fine particles (a) and the organic fine particles (b).

Because of the presence of the solvent having a property of swelling the organic fine particles (a) and the organic fine particles (b), the impregnation layer can be more reliably formed in the organic fine particles (a) and the organic fine particles (b) regardless of the degree of the swelling property of the binder component. Therefore, it is more preferred that at least the solvent has the property of swelling the organic fine particles (a) and the organic fine particles (b), based on the assumption that the solvent first acts on the organic fine particles (a) and the organic fine particles (b) and swells the organic fine particles (a) and the organic fine particles (b), and then these particles are impregnated with the low-molecular weight components included in the binder component.

In the antiglare film of the present invention, the combination of the radiation curable binder and the solvent is particularly preferably a combination of a (meth)acrylate monomer as the binder component because it has a low molecular weight and the impregnation layer is thus easily impregnated therewith, and a ketone- or ester-based solvent having a property that easily swells the organic fine particles (a).

Further, the amount of impregnation of low-molecular weight components included in the binder component can be controlled by adjusting the degree of swelling of the organic fine particles (a) and/or organic fine particles (b) by mixing the above-descried solvent thereinto.

More preferably, the solvent has a property of swelling the organic fine particles and the light-transmitting substrate. In the antireflection film of the present invention thus formed using such a solvent, the light-transmitting substrate is impregnated with the binder component, and this results in excellent bonding performance between the light-transmitting substrate and the diffusion layer and excellent prevention against interference fringe.

The diffusion layer preferably further contains a layered inorganic compound. The layered inorganic compound contained in the diffusion layer can improve the properties of the diffusion layer such as anti-curling, ultraviolet light resistance, and shock resistance such as anti-cracking.

The layered inorganic compound is not particularly limited, and examples thereof include montmorillonite, beidellite, nontronite, saponite, hectorite, sauconite, stevensite, vermiculite, halloysite, kaolinite, endellite, dickite, talc, pyrophyllite, mica, margarite, muscovite, phlogopite, tetrasililic mica, taeniolite, antigorite, chlorite, cookeite, and pennantite. These layered inorganic compounds may be natural or synthetic products.

Talc is preferred among the above layered inorganic compounds. For example, in the case where talc is used as the layered inorganic compound, crosslinked acrylic beads are used as the organic fine particles (a), and styrene particles are used as the organic fine particles (b), it is possible to suitably control the degree of agglomeration of the organic fine particles (A) and the organic fine particles (B) in the diffusion layer. As a result, the antiglare film of the present invention can be provided with high levels of antiglare, anti-discoloration, and anti-scintillation properties.

This is assumed to be due to the talc being a highly lipophilic substance. Specifically, it is assumed that the highly lipophilic talc controls agglomeration the hydrophilic organic fine particles (a) (crosslinked acrylic resin) and the lipophilic organic fine particles (b) (styrene).

The amount of the layered inorganic compound in the diffusion layer is preferably 0.1 to 20 parts by mass based on 100 parts by mass of the cured product of the binder component. In the case where the amount is less than 0.1 parts by mass, the antiglare film of the present invention may have insufficient shock resistance and/or the organic fine particles (A) or the like may have insufficient dispersibility. In the case where the amount is more than 20 parts by mass, the viscosity of the coating solution for forming the diffusion layer may be too high to apply or it may not be possible to control projections and depressions on the surface of the coating film to be formed. A more preferred lower limit of the amount of the layered inorganic compound is 0.5 parts by mass, and a more preferred upper limit thereof is 10 parts by mass. With the amount in this range, the effects such as shock resistance and/or dispersibility of the fine particles can be more reliably exerted, and the projections and depressions on the surface can be more easily controlled.

The coating solution can be prepared by mixing the above-described components.

The method for mixing the components and preparing the coating solution is not particularly limited. For example, a paint shaker or a bead mill may be used.

The diffusion layer can be formed by applying the coating solution to at least one side of the light-transmitting substrate, drying the coating solution to form a coating film, and curing the coating film.

The method of applying the coating solution is not particularly limited. Examples thereof include roll coating, Mayer bar coating, gravure coating, and dye coating.

As described above, the organic fine particles (A) are prepared by swelling the organic fine particles (a) by the binder component and/or solvent and forming the impregnation layer impregnated with the binder component. The organic fine particles (A) may be prepared in the coating solution or in a coating film formed by applying the coating solution to the light-transmitting substrate.

Further, the coating solution thus prepared is preferably left to stand for a predetermined period of time before forming the diffusion layer.

This is because when the diffusion layer is formed without allowing the prepared coating solution to stand, a sufficient impregnation layer may not be formed in the organic fine particles (A) in the diffusion layer, even if the degree of crosslinking of the organic fine particles (A) used and the degree of swelling of the organic fine particles (A) by the binder component and/or solvent are suitably adjusted.

The period in which the coating solution is left to stand may be suitably adjusted according to the type of the organic fine particles (A) used, the degree of crosslinking, the particle size, the types of the ionizing radiation curable binder and/or solvent, or the like. For example, the aging period is preferably about 12 to 48 hours.

The diffusion layer can be formed by curing a coating film formed on the light-transmitting substrate.

Although the method for curing the coating film is not particularly limited, curing by ultraviolet irradiation is preferred. When curing is carried out by ultraviolet light, it is preferred to use ultraviolet light with a wavelength of 190 to 380 nm. Curing by ultraviolet light can be achieved using, for example, metal halide lamps, high-pressure mercury vapor lamps, low-pressure mercury vapor lamps, ultra-high pressure mercury vapor lamps, carbon-arc lamps, black light fluorescent lamps, and the like. Specific examples of electron beam sources include electron beam accelerators of various types such as Cockcroft-Walton type, Van de Graaff type, resonance transformation type, insulation core transformer type, linear type, dynamitron type, and high-frequency type.

In the antiglare film of the present invention, the diffusion layer has a surface roughness on the surface.

The diffusion layer preferably has projections (hereinafter also referred to as "projections (A)") at the positions corresponding to the organic fine particles (A) in the diffusion layer. The height of the projections (A) is preferably lower than that of projections (hereinafter also referred to as "projections (C)") on the surface of a diffusion layer (C) containing organic fine particles (C), wherein the projections (C) are formed at the positions corresponding to the organic fine particles (C), and the diffusion layer (C) satisfies all of the following requirements (1), (2), and (3).

Requirement (1): the diffusion layer (C) is formed under the same conditions as in the diffusion layer containing the organic fine particles (A), except that the organic fine particles (C) are used instead of the organic fine particles (A).

Requirement (2): the organic fine particles (C) in the diffusion layer (C) have the same average particle size as the organic fine particles (A) in the diffusion layer.

Requirement (3): the organic fine particles (C) do not have the impregnation layer in the diffusion layer (C).

The projections (A) are lower in height and smoother in shape, compared to the projections (C). The antiglare film of the present invention including the diffusion layer having such projections (A) can be provided with excellent antiglare and anti-discoloration properties.

The reason thereof is assumed to be because the organic fine particles (A) at the time of curing of the coating film are the organic fine particles (A) having the impregnation layer, and these organic fine particles (A) are very highly flexible, compared to the organic fine particles (C). Specifically, while the binder component causes cross-linked curing shrinkage upon curing of the coating film, the surface where the organic fine particles (A) are located contains less binder component and thus undergoes less cross-linked curing shrinkage than the surface where the organic fine particles (A) are not located. However, it is assumed that because the organic fine particles (A) are highly flexible, the organic fine particles (A) are deformed by cross-linked curing shrinkage of the coating film, and the projections (A) formed is thus shorter in height and smoother than the projections (C) formed on the surface of the diffusion layer (C) containing the organic fine particles (C) having higher hardness.

For the height of the projections, the antiglare film surface is observed by AFM, and the height of a projection on the surface is measured from the top thereof to an inflection point where the slope of the projection turns downward to form a depression. An average height obtained by measuring the heights of 10 projections (any projections) is regarded as the height of the projections.

Because the antiglare film of the present invention has the above-described diffusion layer, the adhesion between the organic fine particles (A) in the diffusion layer and the cured product of the binder component is extremely excellent. The antiglare film of the present invention is such that no cracking occurs in a mandrel test using a mandrel having a diameter of 10 mm, more preferably 8 mm, and still more preferably 6 mm.

Further, in the case where the above described impregnation layer is formed in the organic fine particles (A) in the diffusion layer, the impregnation layer is formed as the binder component being mixed thereinto. This makes it possible to achieve an adequate internal diffusion property while suitably preventing the reflection of light transmitted through the diffusion layer at the interface between the organic fine particles (A) (impregnation layer) in the diffusion layer and the cured product of the binder component.

Further, the projections formed at the positions corresponding to the organic fine particles (A) in the diffusion layer can be made shorter in height and smoother in shape.

Accordingly, the antiglare film of the present invention can be provided with high levels of antiglare, anti-discoloration, and anti-scintillation properties.

To reliably obtain such an impregnation layer, it is preferred that the organic fine particles (A) be lightly cross-linked, and it is more preferred that both of the organic fine particles (A) and the organic fine particles (B) be lightly crosslinked.

In the antiglare film of the present invention, the thickness of the diffusion layer is preferably 1 to 20 µm. With a thickness of less than 1 µm, the antiglare film of the present invention may have an insufficient hard coat property. With a thickness of more than 20 µm, the antireflection film may have insufficient resistance to curling and cracking. A more preferred lower limit of the thickness of the diffusion layer is 2 µm. A more preferred upper limit is 15 µm.

The thickness of the diffusion layer is determined based on the following measurement procedure by observing a cross section of the antiglare film under a confocal laser microscope (Leica TCS-NT manufactured by Leica, with 10 to 100× objective lens) and determining the presence or absence of the interface.

Measurement Procedure (1) In order to obtain a clear image without halation, the antiglare film was observed using a wet objective lens on a confocal laser microscope, with about 2 mL of oil having a refractive index of 1.518 placed on the antiglare film. Oil was used to eliminate an air layer between the objective lens and the diffusion layer.

(2) The film thickness from the substrate was measured at two points per screen, one at the largest projection and the other at the smallest depression. A total of 10 points were measured from 5 screens and an average was calculated as the thickness of the diffusion layer.

In the case of an antiglare film in which the boundary is unclear under the confocal laser microscope, it is possible to create a cross section using a microtome or the like and calculate the thickness of the diffusion layer by observation in the same manner as in (2) above under an electron microscope.

In the antiglare film of the present invention, the change in haze value before and after a heat and humidity resistance test at 60° C. and 90% RH for 1,000 hours is preferably 1.5% or less. A change of more than 1.5% may result in poor heat and humidity resistance and may cause changes in the degree of antiglare over time associated with changes in humidity and temperature. The change in haze value is preferably 1.0% or less. Such heat and humidity resistance can be obtained by incorporating the organic fine particles (A) having the impregnation layer into the diffusion layer.

The haze value is a value determined using a haze meter HM150 (manufactured by Murakami Color Research Laboratory, product name) in accordance with the method of measuring the haze defined in JIS-K7136.

Such a method for producing the antiglare film of the present invention is also another aspect of the present invention.

Specifically, the method for producing the antiglare film of the present invention is a method for producing an antiglare film including a light-transmitting substrate and a diffusion layer, the diffusion layer having a surface roughness on a surface thereof and being formed on at least one side of the light-transmitting substrate, the method including the steps of: applying a coating solution containing organic fine particles (A), organic fine particles (B), and a binder component on at least one side of the light-transmitting substrate; drying the coating solution to form a coating film; and curing the coating film to form the diffusion layer, and the following expressions (1) to (3) are satisfied:

$$\Delta_A < \Delta_B \quad \text{expression (1),}$$

$$R_A > R_B \quad \text{expression (2), and}$$

$$C_A/R_A^3 < C_B/R_B^3 \quad \text{expression (3),}$$

where $C_A$ represents a content of the organic fine particles (A) in the diffusion layer, $R_A$ represents an average particle size thereof, and $\Delta_A$ represents a refractive index difference thereof with respect to the cured product of the binder component; and $C_B$ represents a content of the organic fine particles (B) in the diffusion layer, $R_B$ represents an average particle size thereof, and $\Delta_B$ represents a refractive index difference thereof with respect to the cured product of the binder component.

In the method for producing the antiglare film of the present invention, materials and the like constituting the coating solution are the same as those described above for the antiglare film of the present invention.

The process of forming the diffusion layer is also the same as that described above for the antiglare film of the present invention.

A polarizer including a polarizing element, wherein the polarizer is provided with the antiglare film of the present invention by, for example, bonding a light-transmitting substrate to the surface of the polarizing element is another aspect of the present invention.

The polarizing element is not particularly limited. For example, polyvinyl alcohol film, polyvinyl formal film, polyvinyl acetal film, ethylene-vinyl acetate copolymer-based saponified film, or the like which have been dyed with iodine or the like, and stretched can be used. In lamination of the polarizing element and the antiglare film of the present invention, the light-transmitting substrate is preferably saponified. Saponification treatment improves bonding performance and also results in an antistatic effect.

The present invention also provides an image display device including the antiglare film or the polarizer on the outermost surface thereof. The image display device may be, for example, an LCD, a PDP, an FED, an ELD (organic EL or inorganic EL), a CRT, an electronic paper, a touch panel, or a tablet PC.

The LCD includes a transmissive display and a light source device that irradiates the transmissive display from behind. In the case where the image display device of the present invention is an LCD, the antiglare film of the present invention or the polarizer of the present invention is formed on the surface of the transmissive display.

When the present invention is a liquid crystal display device having the antiglare film, light from the light source device is emitted from below the antiglare film. In the case of an STN liquid crystal display device, a retarder may be provided between the liquid crystal display element and the polarizer. A bonding layer may be provided, if necessary, between each layer of the liquid crystal display device.

The PDP includes a front glass substrate (in which electrodes are formed on the surface) and a rear glass substrate (in which electrodes and microscopic grooves are formed on the surface; and red, green, and blue phosphor layers are formed in the grooves) facing the front glass substrate, with a discharge gas enclosed between these substrates. In the case where the image display device of the present invention is a PDP, the PDP includes above-described antiglare film disposed on the surface of the front glass substrate or a front plate (a glass substrate or a film substrate) thereof.

The image display device may be, for example, an ELD apparatus in which phosphors such as zinc sulfide or diamines, which emit light when a voltage is applied thereto, are deposited on a glass substrate, and the voltage to be applied to the substrate is controlled to perform display; or a CRT that converts electrical signals into light and produces images visible to human eyes. In this case, each such image display device includes the above-described antiglare film on the outermost surface thereof, or on the surface of a front plate thereof.

In any of the cases, the antiglare film of the present invention can be used for displays such as televisions, computers, and electronic paper. In particular, the image display device can be suitably used in the surface of displays for high-definition images, such as CRTs, liquid crystal panels, PDPs, ELDs, FEDs, electronic paper, touch panels, and tablet PCs.

Advantageous Effects of Invention

The antiglare film of the present invention has an excellent antiglare property and can suitably prevent the occurrence of scintillation and a decrease in contrast because the above-described specific relationship is satisfied by the content $C_A$ of the organic fine particles (A) in the diffusion layer, the average particle size $R_A$ thereof, the refractive index difference $\Delta_A$ thereof with respect to the cured product of the binder component, the content $C_B$ of the organic fine particles (B) in the diffusion layer, the average particle size $R_B$ thereof, and the refractive index difference $\Delta_B$ thereof with respect to the cured product of the binder component.

DESCRIPTION OF EMBODIMENTS

Figure 1:
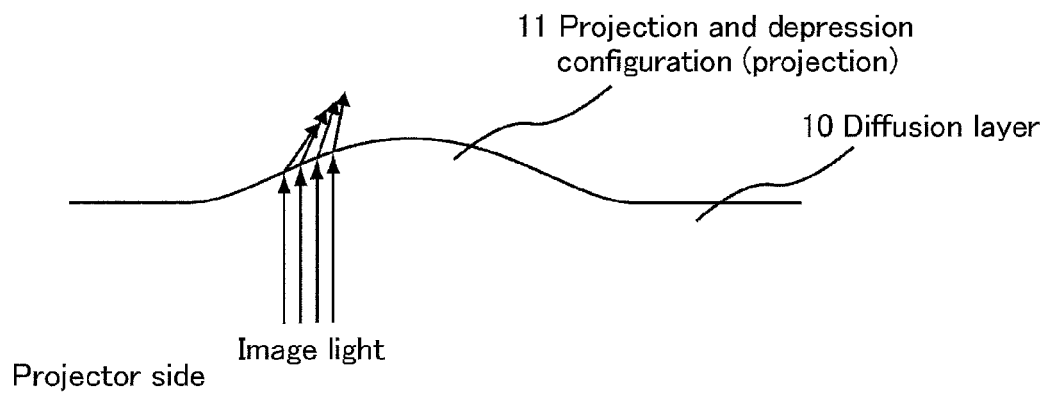
FIG. 1(a) shows a cross section schematically illustrating how image light transmitting through a diffusion layer that does not produce scintillation is refracted on the diffusion layer surface.
FIG. 1(b) is a graph showing the relationship between the brightness of the image light shown in FIG. 1(a) and the diffusion angle.
Figure 1:
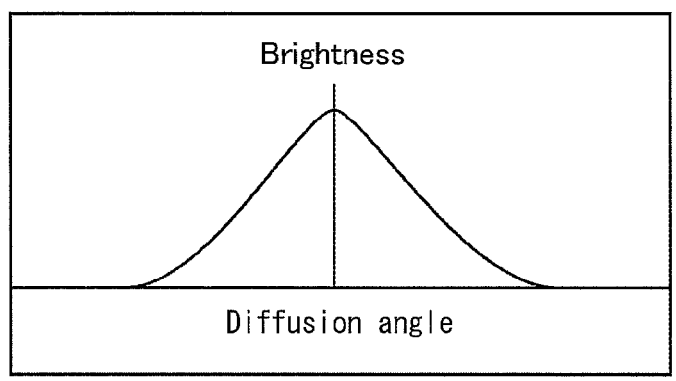
Figure 2:
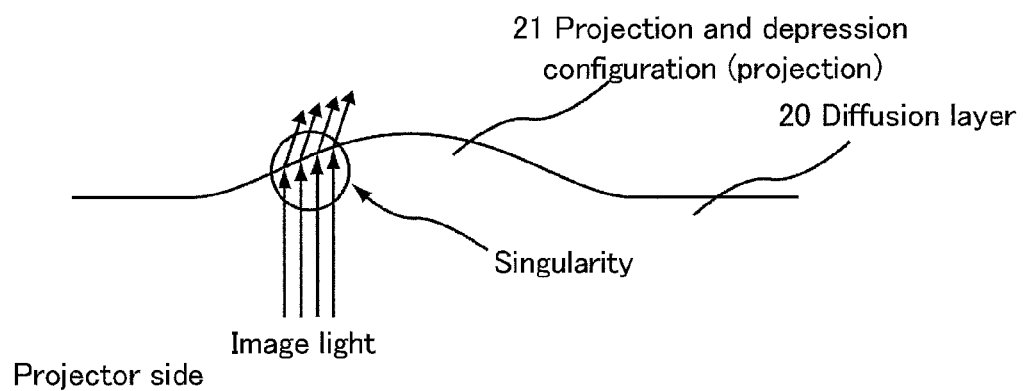
FIG. 2(a) shows a cross section schematically illustrating how image light transmitting through a diffusion layer that produces scintillation is refracted on the diffusion layer surface.
FIG. 2(b) is a graph showing the relationship between the brightness of the image light shown in FIG. 2(a) and the diffusion angle.
Figure 2:
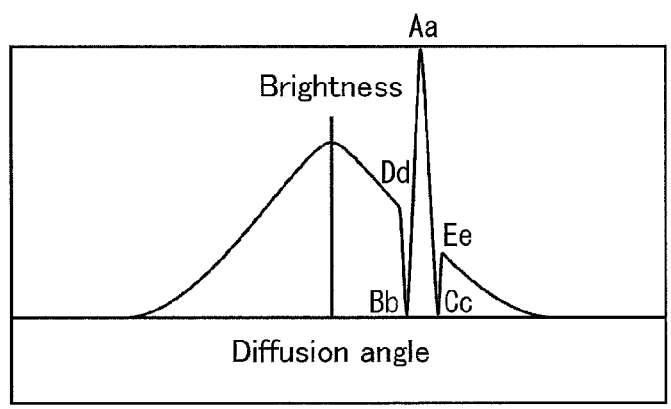

The present invention is described with reference to the following examples; however, interpretation of the present invention should not be limited to these examples.

Example 1

First, triacetyl cellulose (manufactured by Fujifilm Corporation, thickness of 80 μm) was provided as a light-transmitting substrate.

Next, a coating solution having the following composition was prepared.

Binder component [a mixture of pentaerythritol triacrylate (PETA), dipentaerythritol hexaacrylate (DPHA), and polymethyl methacrylate (PMMA; weight average molecular weight of 75,000), (mass ratio; PETA/DPHA/PMMA=80/10/10) (refractive index of 1.52)], 100 parts by mass Photopolymerization initiator (product name: Irgacure 184; manufactured by BASF Japan Ltd.), 5.0 parts by mass Organic particles (A) [lightly crosslinked acrylic particles (refractive index of 1.49, and average particle size of 5.0 μm), manufactured by Soken Chemical & Engineering Co., Ltd.],) 7.0 parts by mass Organic particles (B) [lightly crosslinked polystyrene particles (refractive index of 1.59, and average particle size of 2.0 μm), manufactured by Sekisui Plastics Co., Ltd.]), 3.0 parts by mass Talc (refractive index of 1.57, average particle size of 0.8 μm, manufactured by Nippon Talc Co., Ltd.), 2.0 parts by mass Solvent [a mixture of toluene and methyl isobutyl ketone (mass ratio; toluene/methyl isobutyl ketone=8/2)], 190 parts by mass The prepared coating solution was aged for 24 hours, subsequently applied to a light-transmitting substrate using a Meyer bar, and dried for 1 minute by flowing dry air at 70° C. with a flow rate of 1.2 m/s. Thus, a coating film was formed.

Subsequently, the coating film thus formed was irradiated with ultraviolet light (200 mJ/cm$^2$ in a nitrogen atmosphere) to cure the binder component to form a diffusion layer. Thus, an antiglare film was prepared. The thickness of the diffusion layer was 6.0 μm.

Example 2

An antiglare film was prepared in the same manner as in Example 1 except that a coating solution having the following composition was used.

Binder component [a mixture of pentaerythritol triacrylate (PETA), dipentaerythritol hexaacrylate (DPHA), and polymethyl methacrylate (PMMA; weight average molecular weight of 75,000), (mass ratio; PETA/DPHA/PMMA=80/10/10), (refractive index of 1.52)], 100 parts by mass Photopolymerization initiator (product name: Irgacure 184; manufactured by BASF Japan Ltd.), 5.0 parts by mass Organic particles (A) [lightly crosslinked acrylic particles (refractive index of 1.49, and average particle size of 5.0 μm), manufactured by Soken Chemical & Engineering Co., Ltd.]), 7.0 parts by mass Organic particles (B) [lightly crosslinked polystyrene particles (refractive index of 1.59, and average particle size of 3.5 μm), manufactured by Soken Chemical & Engineering Co., Ltd.]), 5.0 parts by mass Talc (refractive index of 1.57, average particle size of 0.8 μm, manufactured by Nippon Talc Co., Ltd.), 2.0 parts by mass Solvent [a mixture of toluene and methyl isobutyl ketone (mass ratio; toluene/methyl isobutyl ketone=8/2)], 190 parts by mass Example 3

An antiglare film was prepared in the same manner as in Example 1 except that a coating solution having the following composition was used.

Binder component [a mixture of pentaerythritol triacrylate (PETA), dipentaerythritol hexaacrylate (DPHA), and polymethyl methacrylate (PMMA; weight average molecular weight of 75,000), (mass ratio; PETA/DPHA/PMMA=80/10/10), (refractive index of 1.52)], 100 parts by mass Photopolymerization initiator (product name: Irgacure 184; manufactured by BASF Japan Ltd.), 5.0 parts by mass Organic fine particles (A) [lightly crosslinked acrylic particles (refractive index of 1.49, and average particle size of 5.0 μm), manufactured by Soken Chemical & Engineering Co., Ltd.]), 7.0 parts by mass Organic particles (B) [lightly crosslinked polystyrene particles (refractive index of 1.59, average particle size of 3.5 μm, manufactured by Soken Chemical & Engineering Co., Ltd.)] 2.5 parts by mass Talc (refractive index of 1.57, average particle size of 0.8 μm, manufactured by Nippon Talc Co., Ltd.), 2.0 parts by mass Solvent [a mixture of toluene and methyl isobutyl ketone (mass ratio; toluene/methyl isobutyl ketone=8/2)], 190 parts by mass Example 4

An antiglare film was prepared in the same manner as in Example 1 except that a coating solution having the following composition was used.

Binder component [a mixture of pentaerythritol triacrylate (PETA), dipentaerythritol hexaacrylate (DPHA), and polymethyl methacrylate (PMMA; weight average molecular weight of 75,000), (mass ratio; PETA/DPHA/PMMA=80/10/10), (a refractive index of 1.52)], 100 parts by mass Photopolymerization initiator (product name: Irgacure 184; manufactured by BASF Japan Ltd.), 5.0 parts by mass Organic fine particles (A) [lightly crosslinked acrylic particles (refractive index of 1.49, average particle size of 5.0 μm, manufactured by Soken Chemical & Engineering Co., Ltd.)], 7.0 parts by mass Organic fine particles (B) [lightly crosslinked polystyrene particles (refractive index of 1.59, average particle size of 3.5 μm, manufactured by Soken Chemical & Engineering Co., Ltd.)], 5.0 parts by mass Solvent [a mixture of toluene and methyl isobutyl ketone (mass ratio; toluene/methyl isobutyl ketone=8/2)], 190 parts by mass Example 5

An antiglare film was prepared in the same manner as in Example 1 except that a coating solution having the following composition was used.

Binder component [a mixture of pentaerythritol triacrylate (PETA), dipentaerythritol hexaacrylate (DPHA), and polymethyl methacrylate (PMMA; weight average molecular weight of 75,000), (mass ratio; PETA/DPHA/PMMA=80/10/10), (refractive index of 1.52)], 100 parts by mass Photopolymerization initiator (product name: Irgacure 184; manufactured by BASF Japan Ltd.), 5.0 parts by mass Organic fine particles (A) [lightly crosslinked acrylic particles (refractive index of 1.49, average particle size of 5.0 μm, manufactured by Soken Chemical & Engineering Co., Ltd.)], 7.0 parts by mass Organic particles (B) [highly crosslinked polystyrene particles (refractive index of 1.59, average particle size of 3.5 μm, manufactured by Soken Chemical & Engineering Co., Ltd.)], 5.0 parts by mass Talc (refractive index of 1.57, average particle size of 0.8 μm, manufactured by Nippon Talc Co., Ltd.), 2.0 parts by mass Solvent [a mixture of toluene and methyl isobutyl ketone (mass ratio; toluene/methyl isobutyl ketone=8/2)], 190 parts by mass Example 6

An antiglare film was prepared in the same manner as in Example 1 except that a coating solution having the following composition was used.

Binder component [a mixture of pentaerythritol triacrylate (PETA), dipentaerythritol hexaacrylate (DPHA), and polymethyl methacrylate (PMMA; weight average molecular weight of 75,000), (mass ratio; PETA/DPHA/PMMA=80/10/10), (refractive index of 1.52)], 100 parts by mass Photopolymerization initiator (product name: Irgacure 184; manufactured by BASF Japan Ltd.), 5.0 parts by mass Organic fine particles (A) [highly crosslinked acrylic particles (refractive index of 1.49, average particle size of 5.0 μm, manufactured by Soken Chemical & Engineering Co., Ltd.)], 7.0 parts by mass Organic particles (B) [highly crosslinked polystyrene particles (refractive index of 1.59, average particle size of 3.5 μm, manufactured by Soken Chemical & Engineering Co., Ltd.)], 5.0 parts by mass Talc (refractive index of 1.57, average particle size of 0.8 μm, manufactured by Nippon Talc Co., Ltd.), 2.0 parts by mass Solvent [a mixture of toluene and methyl isobutyl ketone (mass ratio; toluene/methyl isobutyl ketone=8/2)], 190 parts by mass Comparative Example 1

An antiglare film was prepared in the same manner as in Example 1 except that a coating solution having the following composition was used.

Binder component [a mixture of pentaerythritol triacrylate (PETA), dipentaerythritol hexaacrylate (DPHA), and polymethyl methacrylate (PMMA; weight average molecular weight of 75,000) (mass ratio; PETA/DPHA/PMMA=80/10/10) (refractive index of 1.52)], 100 parts by mass Photopolymerization initiator (product name: Irgacure 184; manufactured by BASF Japan Ltd.), 5.0 parts by mass Organic particles (A) [lightly crosslinked acrylic particles (refractive index of 1.49, average particle size of 5.0 μm, manufactured by Soken Chemical & Engineering Co., Ltd.)], 7.0 parts by mass Organic particles (B) [lightly crosslinked acrylic particles (refractive index of 1.59, average particle size of 3.5 μm, manufactured by Soken Chemical & Engineering Co., Ltd.)], 2.0 parts by mass Talc (refractive index of 1.57, average particle size of 0.8 μm, manufactured by Nippon Talc Co., Ltd.), 2.0 parts by mass Solvent [a mixture of toluene and methyl isobutyl ketone (mass ratio; toluene/methyl isobutyl ketone=8/2)], 190 parts by mass Comparative Example 2

An antiglare film was prepared in the same manner as in Example 1 except that a coating solution having the following composition was used.

Binder component [a mixture of pentaerythritol triacrylate (PETA), dipentaerythritol hexaacrylate (DPHA), and polymethyl methacrylate (PMMA; weight average molecular weight of 75,000) (mass ratio; PETA/DPHA/PMMA=80/10/10) (refractive index of 1.52)], 100 parts by mass Photopolymerization initiator (product name: Irgacure 184; manufactured by BASF Japan Ltd.), 5.0 parts by mass Organic particles (A) [highly crosslinked acrylic particles (refractive index of 1.49, average particle size of 5.0 μm, manufactured by Soken Chemical & Engineering Co., Ltd.)], 7.0 parts by mass Organic particles (B) [highly crosslinked polystyrene particles (refractive index of 1.59, average particle size of 3.5 μm, manufactured by Soken Chemical & Engineering Co., Ltd.)], 2.0 parts by mass Talc (refractive index of 1.57, average particle size of 0.8 μm, manufactured by Nippon Talc Co., Ltd.), 2.0 parts by mass Solvent [a mixture of toluene and methyl isobutyl ketone (mass ratio; toluene/methyl isobutyl ketone=8/2)], 190 parts by mass The antiglare films prepared in the examples and the comparative examples were evaluated as follows. Table 1 shows the results.

In Table 1, in regard to the organic fine particles (A), those before being introduced into the diffusion layer are represented by "a", and those in the diffusion layer are represented by "A"; and contents $C_a$ and $C_A$ of these particles, average particle sizes $R_a$ and $R_A$, refractive index differences $\Delta_a$ and $\Delta_A$ with respect to the cured product of the binder component, and $C_a/R_a^3$ and $C_A/R_A^3$ are also shown. Further, in regard to the organic fine particles (B), those before being introduced into the diffusion layer are represented by "b", and those in the diffusion layer are represented by "B"; and contents $C_b$ and $C_B$ of these particles, average particle sizes $R_b$ and $R_B$, refractive index differences $\Delta_b$ and $\Delta_B$ with respect to the cured product of the binder component, and $C_b/R_b^3$ and $C_B/R_B^3$ are also shown.

(Thickness of the Impregnation Layer)

The antiglare films prepared in the examples and the comparative examples were cut in the thickness direction of the diffusion layer, and cross sections containing at least one organic fine particle (A) were observed using STEM at 3,000 to 50,000 magnification. The thickness was measured at two sites where the organic fine particle (A) is impregnated with the binder component; the boundary between the organic fine particle (A) and the cured product of the binder component surrounding the organic fine particle (A) is relatively clear; and the organic fine particle (A) seems to be impregnated with the binder component to the fullest degree. A total of 5 organic fine particles (A) were measured in the same manner and an average of 10 measurements was calculated.

Figure 3:
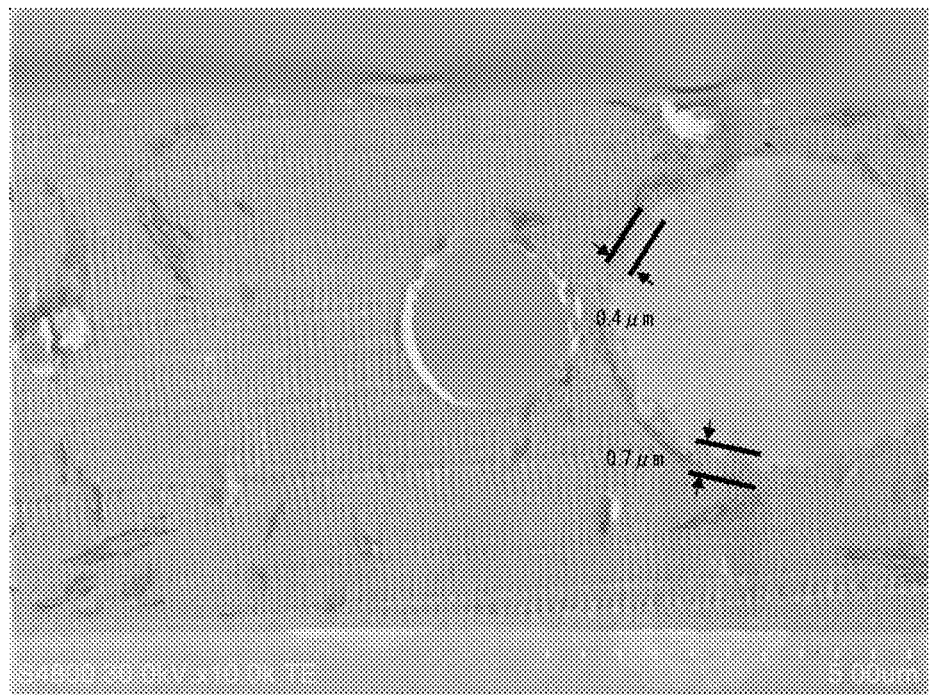
FIG. 3 is a cross-sectional STEM image of a diffusion layer in an antiglare film according to Example 1.
Figure 4:
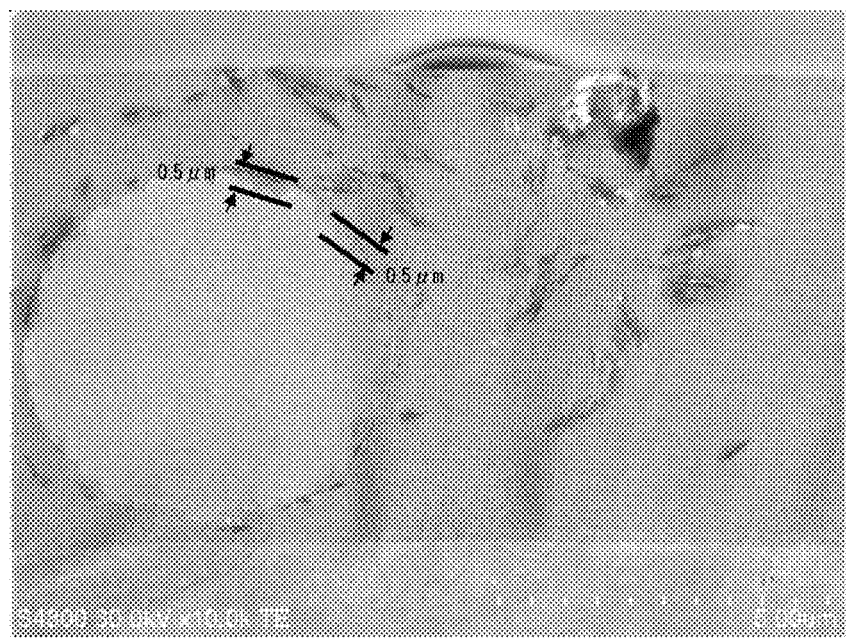
FIG. 4 is a cross-sectional STEM image of a diffusion layer in an antiglare film according to Example 2.

FIG. 3 shows a cross-sectional STEM image of the diffusion layer in the antiglare film according to Example 1. FIG. 4 shows a cross-sectional STEM image of the diffusion layer in the antiglare film according to Example 2.

In the case where the diffusion layer contains the organic fine particles (B) or the like in addition to the organic fine particles (A), the thickness of the impregnation layer in the organic fine particles (B) can also be measured in the same manner as described above.

(Haze)

The haze values of the antiglare films prepared in the examples and the comparative examples were measured using a haze meter HM150 (manufactured by Murakami Color Research Laboratory) in accordance with the method of measuring the haze specified in JIS-K7136.

(Contrast)

The antiglare films prepared in the examples and the comparative examples were bonded to black acrylic plates using a transparent adhesive film for optical film, and subjected to visual and sensory evaluation by 15 testers in regard to the surface conditions of the antiglare films from various angles under bright light conditions (1,000 Lx). Whether glossy black can be reproduced was determined, and evaluation was made based on the following criteria.

Excellent: Evaluated as "good" by 13 or more people.
Good: Evaluated as "good" by 10 to 12 people.
Fairly Good: Evaluated as "good" by 8 or 9 people.
Acceptable: Evaluated as "good" by 5 to 7 people.
Poor: Evaluated as "good" by 4 or less people.

(Scintillation)

A polarizer at the outermost surface of KDL-40X2500 (liquid crystal television manufactured by Sony Corporation) was removed, and a polarizer with an uncoated surface was bonded to the liquid crystal television.

Then, the antiglare films prepared in the examples and the comparative examples were individually bonded thereto such that the diffusion layer would be the outermost surface, using a transparent adhesive film for optical film (products having a total light transmission of 91% or more, a haze of 0.3% or less, and a film thickness of 20 to 50 μm; for example, MHM series manufactured by Nichiei Kakoh Co., Ltd.).

The liquid crystal television was placed in an indoor environment with a luminance of about 1,000 Lx. A white screen was displayed and subjected to visual and sensory evaluation by 15 testers from various angles, side to side and up and down, at a position about 1.5 to 2.0 m away from the liquid crystal television. The presence of scintillation on the white screen was determined and evaluation was made based on the following criteria.

○○: Evaluated as "good" by 10 or more people.
○: Evaluated as "good" by 8 or 9 people.
Δ: Evaluated as "good" by 5 to 7 people.
x: Evaluated as "good" by 4 or less people.

TABLE 1

| | Organic fine particles (A) | | | | | | | | | Organic fine particles (B) | | | |
|---|---|---|---|---|---|---|---|---|---|---|---|---|---|
| | $\Delta_a$ | $\Delta_A$ | $R_a$ (μm) | $R_A$ (μm) | $C_a$ | $C_A$ | $C_a/R_a^3$ | $C_A/R_A^3$ | Impregnation layer thickness (μm) | $\Delta_b$ | $\Delta_B$ | $R_b$ (μm) | $R_B$ (μm) |
| Example 1 | 0.03 | 0.01 | 5.0 | 5.4 | 7.0 | 9.3 | 0.056 | 0.059 | 0.5 | 0.07 | 0.04 | 2.0 | 2.1 |
| Example 2 | 0.03 | 0.01 | 5.0 | 5.4 | 7.0 | 9.2 | 0.056 | 0.058 | 0.5 | 0.07 | 0.04 | 3.5 | 3.7 |
| Example 3 | 0.03 | 0.01 | 5.0 | 5.4 | 7.0 | 9.2 | 0.056 | 0.058 | 0.5 | 0.07 | 0.04 | 3.5 | 3.7 |
| Example 4 | 0.03 | 0.01 | 5.0 | 5.4 | 7.0 | 9.2 | 0.056 | 0.058 | 0.5 | 0.07 | 0.04 | 3.5 | 3.7 |
| Example 5 | 0.03 | 0.01 | 5.0 | 5.4 | 7.0 | 9.2 | 0.056 | 0.058 | 0.5 | 0.07 | 0.07 | 3.5 | 3.5 |
| Example 6 | 0.03 | 0.03 | 5.0 | 5.0 | 7.0 | 7.2 | 0.056 | 0.058 | 0.0 | 0.07 | 0.07 | 3.5 | 3.5 |
| Comparative Example 1 | 0.03 | 0.01 | 5.0 | 5.4 | 7.0 | 9.2 | 0.056 | 0.058 | 0.5 | 0.07 | 0.04 | 3.5 | 3.7 |
| Comparative Example 2 | 0.03 | 0.03 | 5.0 | 5.0 | 7.0 | 7.2 | 0.056 | 0.058 | 0.0 | 0.07 | 0.07 | 3.5 | 3.5 |

| | Organic fine particles (B) | | | | | Evaluation | | |
|---|---|---|---|---|---|---|---|---|
| | $C_b$ | $C_B$ | $C_b/R_b^3$ | $C_B/R_B^3$ | Impregnation layer thickness (μm) | Hz | Contrast | Scintillation |
| Example 1 | 3.0 | 3.6 | 0.375 | 0.389 | 0.1 | 11.2 | Excellent | Excellent |
| Example 2 | 5.0 | 6.0 | 0.117 | 0.118 | 0.1 | 12.6 | Good | Excellent |
| Example 3 | 2.5 | 3.2 | 0.058 | 0.063 | 0.1 | 11.0 | Excellent | Acceptable |
| Example 4 | 5.0 | 6.0 | 0.117 | 0.118 | 0.1 | 12.9 | Good | Good |
| Example 5 | 5.0 | 5.1 | 0.117 | 0.119 | 0.0 | 14.1 | Fairly Good | Good |
| Example 6 | 5.0 | 5.2 | 0.117 | 0.121 | 0.0 | 14.5 | Acceptable | Good |
| Comparative Example 1 | 2.0 | 2.5 | 0.047 | 0.049 | 0.1 | 10.2 | Excellent | Poor |
| Comparative Example 2 | 2.0 | 2.0 | 0.047 | 0.047 | 0.0 | 10.6 | Good | Poor |

As shown in Table 1, the antiglare films of Examples 1 and 2 satisfied the expressions (1) to (3), and the results were good in all aspects of the evaluation. In particular, because these antiglare films fully satisfied the expression (3), they had very good results in the evaluation of scintillation. While the antiglare film of Example 3 satisfied the expression (1) to (3), it had slightly poor results in the evaluation of scintillation because the difference between the members of the expression (3) was small. The antiglare film of Example 4 had slightly poor results in the evaluation of scintillation compared to Example 2 because it did not contain talc. The antiglare film of Example 5 showed slightly poor contrast compared to Examples 1 to 4 because the organic fine particles (B) were not impregnated with the binder component. The antiglare film of Example 6 showed even poorer contrast because neither of the organic fine particles (A) nor the organic fine particles (B) were impregnated with the binder component.

On the other hand, the antiglare films of Comparative Examples 1 and 2 had very poor results in the evaluation of scintillation because none of these antiglare films satisfies the expression (3).

INDUSTRIAL APPLICABILITY

The antiglare film of the present invention can be suitably used in displays such as cathode-ray tube (CRT) display devices, liquid crystal display (LCD), plasma display panel (PDP), electroluminescence display (ELD), field emission display (FED), and electronic paper. The antiglare film can be particularly suitably used in high-definition displays.

SEQUENCE LISTING FREE TEXT

10, 20 Diffusion Layer
11, 21 Surface roughness (projection)

The invention claimed is:

1. An antiglare film comprising:
a light-transmitting substrate; and
a diffusion layer having a surface roughness on a surface thereof and being formed on at least one side of the light-transmitting substrate,
wherein the diffusion layer comprises organic fine particles (A), organic fine particles (B), and a cured product of a binder component, and
following expressions (1), (2), and (3) are satisfied:

$$\Delta_A < \Delta_B \quad \text{expression (1),}$$

$$R_A > R_B \quad \text{expression (2), and}$$

$$C_A/R_A^3 < C_B/R_B^3 \quad \text{expression (3),}$$

where $C_A$ represents a content of the organic fine particles (A) in the diffusion layer, $R_A$ represents an average particle size thereof, and $\Delta_A$ represents a refractive index difference thereof relative to the cured product of the binder component, and
$C_B$ represents a content of the organic fine particles (B) in the diffusion layer, $R_B$ represents an average particle size thereof, and $\Delta_B$ represents a refractive index difference thereof relative to the cured product of the binder component, and
wherein the organic fine particles (A) comprise an impregnation layer (A) formed by impregnating with the binder component organic fine particles constituting organic fine particles (A),
the organic fine particles (B) comprise an impregnation layer (B) formed by impregnating with the binder component organic fine particles constituting the organic fine particles (B),
an average thickness of the impregnation layer (B) formed in the organic fine particles (B) is thinner than an average thickness of the impregnation layer (A) formed in the organic fine particles (A), and
wherein the $\Delta_A$ is 0.02 or greater, and the refractive index of the organic fine particles (A) is less than the refractive index of the cured product of the binder component.

2. The antiglare film according to claim 1,
wherein the binder component comprises at least one material selected from the group consisting of a (meth)acrylate monomer and an oligomer thereof.

3. A polarizer comprising a polarizing element,
wherein said polarizer has the antiglare film according to claim 1, on a surface of the polarizing element.

4. An image display device comprising:
the antiglare film according to claim 1, or
a polarizer comprising a polarizing element,
wherein said polarizer has on an outermost surface thereof, the antiglare film according to claim 1 on a surface of the polarizing element.

5. The antiglare film according to claim 1,
wherein the binder component comprises a (meth)acrylate monomer having weight average molecular weight in a range of 5,000 or less.

6. The antiglare film according to claim 1,
wherein both the organic fine particles (A) and the organic fine particles (B) are lightly crosslinked fine particles.

7. A method for producing an antiglare film comprising a light-transmitting substrate and a diffusion layer, the diffusion layer having a surface roughness on a surface thereof and being formed on at least one side of the light-transmitting substrate,
the method comprising steps of:
applying a coating solution containing organic fine particles (A), organic fine particles (B), and a binder component on at least one side of the light-transmitting substrate;
drying the coating solution so as to form a coating film; and
curing the coating film so as to form the diffusion layer,
wherein following expressions from (1) to (3) are satisfied:

$$\Delta_A < \Delta_B \quad \text{expression (1),}$$

$$R_A > R_B \quad \text{expression (2), and}$$

$$C_A/R_A^3 < C_B/R_B^3 \quad \text{expression (3),}$$

where $C_A$ represents a content of the organic fine particles (A) in the diffusion layer, $R_A$ represents an average particle size thereof, and $\Delta_A$ represents a refractive index difference thereof relative to the cured product of the binder component, and
$C_B$ represents a content of the organic fine particles (B) in the diffusion layer, $R_B$ represents an average particle size thereof, and $\Delta_B$ represents a refractive index difference thereof relative to the cured product of the binder component, and
wherein the organic fine particles (A) comprise an impregnation layer (A) formed by impregnating with the binder component organic fine particles constituting organic fine particles (A),
the organic fine particles (B) comprise an impregnation layer (B) formed by impregnating with the binder component organic fine particles constituting the organic fine particles (B), an average thickness of the impregnation layer (B) formed in the organic fine particles (B) is thinner than an average thickness of the impregnation layer (A) formed in the organic fine particles (A), and wherein the $\Delta_A$ is 0.02 or greater, and the refractive index of the organic fine particles (A) is less than the refractive index of the cured product of the binder component.

8. The method according to claim 7,
wherein the binder component comprises a (meth)acrylate monomer having weight average molecular weight in a range of 5,000 or less.

9. The method according to claim 7,
wherein both the organic fine particles (A) and the organic fine particles (B) are lightly crosslinked fine particles.

* * * * *